Dec. 21, 1954     R. R. ANGER     2,697,638
NOZZLE
Filed Dec. 1, 1953
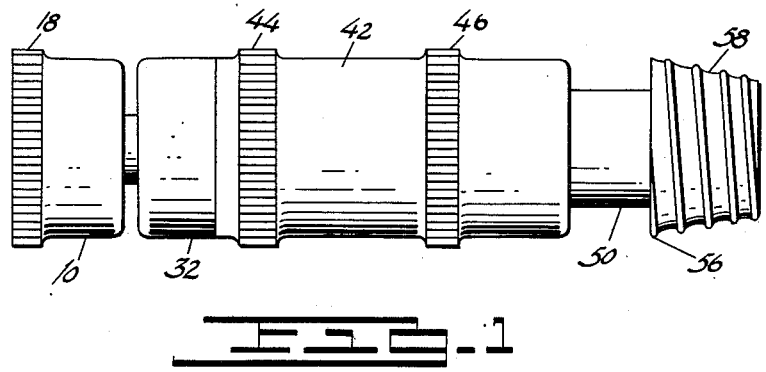
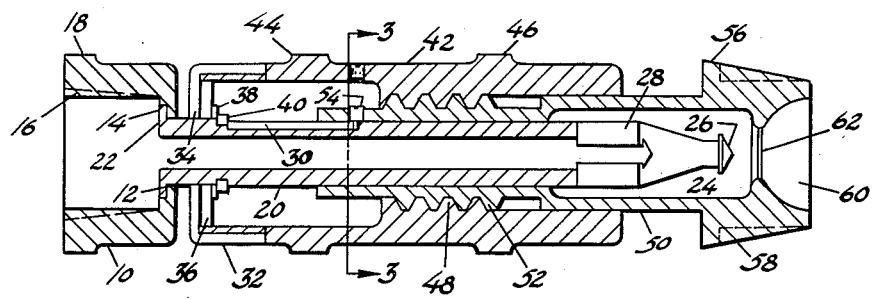
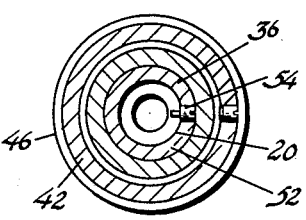
INVENTOR.
ROBERT R. ANGER
BY
ATTORNEY United States Patent Office 2,697,638
Patented Dec. 21, 1954

2,697,638

NOZZLE

Robert R. Anger, Birmingham, Mich.

Application December 1, 1953, Serial No. 395,461

2 Claims. (Cl. 299—131)

This invention relates to nozzles, and more particularly to a combined nozzle and hose coupling.

Broadly, the invention comprehends a combined nozzle and hose coupling wherein the nozzle functions as a valve to regulate the flow of water through or to completely cut off the flow.

An object of the invention is to provide a nozzle for a garden hose having upon its discharge end the male member of a coupling.

Another object of the invention is to provide a nozzle of exceedingly cheap and simple structure having the advantages of quick and positive adjustment.

Another object of the invention is to provide a nozzle having but few parts which may be manufactured and assembled at low cost.

A further object of the invention is to provide a nozzle having the female member of a coupling at its reception or intake and the male member of a coupling at its discharge or outlet and control means intermediate the receiving end, and discharge of the nozzle effective for regulating the flow of water therethrough.

The above and other objects and features of the invention, including various novel and desirable details of construction, will be apparent from the following description of an illustrated embodiment shown in the accompanying drawing, in which:

Figure 1 is an elevational view of the nozzle;

Figure 2 is a longitudinal sectional view of the nozzle; and

Figure 3 is a cross-sectional view taken substantially on line 3—3 of Figure 2.

Referring to the drawings for more specific details of the invention, 10 indicates the female member of a coupling adapted to be threaded on one end of a hose section, not shown. Preferably, the female member is in the form of a cap having a concentrically disposed opening 12 and the wall defining the opening has an annular shoulder 14.

The interior of the cap is threaded as indicated at 16 for the reception of a complementary male member on a hose section and the exterior of the cap is milled as at 18 to facilitate handling.

A sleeve 20 tightly fitted in the opening 12 has a flange 22 seated on the shoulder 14 and preferably secured against displacement. The free end of the sleeve 20 is closed as indicated at 24 and provided with a conical head 26, the purpose of which will hereinafter appear. The sleeve is further provided with spaced slots 28 therethrough back at the head and a relatively shallow longitudinal slot 30.

A cup 32 having a concentrically disposed opening 34 is fitted on the sleeve 20, and a fiber washer 36 fitted closely on the sleeve 20 is held in the bottom of the cup by a relatively thin washer 38 and a split ring 40 seated in a circumferential groove in the sleeve 20.

A sleeve 42 having a press fit in the cup 32 has spaced milled rings 44 and 46 which facilitate in the handling of the nozzle and an internal thread 48. Another sleeve 50 fitted to slide smoothly on the sleeve 20 and the sleeve 42, has on its circumference threads 52 received by the threads 48 on the sleeve 42. The sleeve 50 carries a pin 54 received by the slot 30 in the sleeve 20 so as to inhibit relative rotation between the sleeves 20 and 50.

The free end of the sleeve 50 has thereon a head 56 provided with threads 58 for the purpose of connecting a hose section, and in the head is a semi-spherical recess 60 in the bottom of which is an opening 62 complementary to the conical head 26 on the sleeve 20 so that the opening 62 may be completely closed.

In operation, assuming that the female member 10 is attached to a hose, which in turn is connected to a supply of water under pressure, by turning the sleeve 42 the flow of water through the nozzle may be regulated. When the nozzle is open, water flows through the sleeve 20 and the slots 28 therein into the sleeve 50, thence through the opening 62 and recess 60 in the head of the nozzle, and when the nozzle is closed the conical head 20 sits in the opening 62.

An important feature of the invention is that the head 56 of the nozzle is threaded as indicated at 58 and that this threaded portion constitutes the male member of a coupling facilitating in the connection of a hose, and when so used the nozzle constitutes a valve functioning to regulate the flow of water or to completely cut off the flow.

Although this invention has been shown and described in connection with a certain specific embodiment, the principles involved are susceptible of numerous other applications that will readily occur to persons skilled in the art. The invention is, therefore, to be limited only as indicated by the scope of the appended claims.

Having thus described the invention, what I claim as new and desire to secure by Letters Patent is:

1. A nozzle comprising a female member of a coupling, a sleeve fixedly secured thereto having spaced slots therethrough, a conical head on the fixed sleeve, a slidable sleeve on the fixed sleeve, a head on the slidable sleeve having an opening therethrough cooperating with the conical head on the fixed sleeve, a male member of a coupling on the head of the slidable sleeve, a rotatable sleeve on the slidable sleeve, and means connecting the slidable and rotatable sleeves effective to advance or retract the slidable sleeve upon rotation of the rotatable sleeve.

2. In a nozzle, a female member of a coupling, a sleeve fixedly secured thereto having spaced slots therethrough, a conical head on the fixed sleeve forward of the slots, a slidable sleeve on the fixed sleeve, a head on the slidable sleeve having an opening therethrough for cooperation with the conical head on the fixed sleeve, a male member of a coupling on the head of the slidable sleeve, a rotatable sleeve on the sliding sleeve, and a threaded connection between the slidable and rotatable sleeves.

References Cited in the file of this patent

UNITED STATES PATENTS

| Number | Name | Date |
|---|---|---|
| 2,343,647 | Doerr | Mar. 7, 1944 |
| 2,568,515 | Scheiwer | Sept. 18, 1951 |
| 2,605,143 | Bishop | July 29, 1952 |
| 2,629,633 | Wright | Feb. 24, 1953 |